(12) United States Patent
Christensen

(10) Patent No.: US 7,290,657 B2
(45) Date of Patent: Nov. 6, 2007

(54) TRUCKBED TOOL BOX

(76) Inventor: David Christensen, 11 Moores Mill Rd., Pennington, NJ (US) 08534

( * ) Notice: Subject to any disclaimer, the term of this patent is extended or adjusted under 35 U.S.C. 154(b) by 789 days.

(21) Appl. No.: 10/734,470

(22) Filed: Dec. 12, 2003

(65) Prior Publication Data

US 2005/0145527 A1    Jul. 7, 2005

(51) Int. Cl.
B65D 85/28    (2006.01)
B65D 45/16    (2006.01)
B65D 43/14    (2006.01)
B60R 9/00    (2006.01)

(52) U.S. Cl. ............. 206/372; 224/404; 220/324; 220/840

(58) Field of Classification Search ........ 206/372–379, 206/349; 224/404; 220/476, 480–482, 324, 220/810, 831, 836, 840, 861; 215/43, 45, 215/321
See application file for complete search history.

(56) References Cited

U.S. PATENT DOCUMENTS

| | | | |
|---|---|---|---|
| 2,735,542 A * | 2/1956 | Shnitzler | 206/228 |
| 3,055,534 A * | 9/1962 | Boenecke | 225/39 |
| 3,985,409 A * | 10/1976 | Kneier | 312/271 |
| 4,084,865 A | 4/1978 | Joyce | |
| 4,303,158 A | 12/1981 | Perkins | |
| 4,325,595 A * | 4/1982 | Solomon | 312/183 |
| 4,598,824 A * | 7/1986 | Long et al. | 206/308.3 |
| 4,691,470 A | 9/1987 | Landell et al. | |
| 4,770,330 A | 9/1988 | Bonstead et al. | |
| 5,205,429 A * | 4/1993 | Woolworth et al. | 220/23.83 |
| 5,228,584 A * | 7/1993 | Williams, Jr. | 220/3.8 |
| 5,439,108 A | 8/1995 | Lackie | |
| 5,598,961 A | 2/1997 | Sills | |
| 5,743,584 A | 4/1998 | Lance et al. | |
| 5,779,047 A | 7/1998 | Darrah | |
| 5,873,463 A | 2/1999 | Purcell | |
| 5,882,097 A | 3/1999 | Kohagen et al. | |
| 5,899,420 A * | 5/1999 | Gerardi | 248/146 |
| 6,019,238 A * | 2/2000 | Kindig et al. | 220/4.22 |
| 6,375,054 B1 * | 4/2002 | Lance et al. | 224/404 |

* cited by examiner

*Primary Examiner*—J. Gregory Pickett
(74) *Attorney, Agent, or Firm*—Synnestvedt Lechner & Woodbridge LLP

(57) ABSTRACT

A toolbox having enhanced weather protection includes a base component and a top component connected together by a pair of pivot assemblies. When the top component is pivoted downwardly towards the base component, it forms a first weather and wind seal around its outer perimeter. The top and bottom components each include weather-sealing inside flanges that are complimentary so that when the top component and base component are closed, a secondary weather and wind seal is formed.

14 Claims, 7 Drawing Sheets

TRUCKBED TOOL BOX

BACKGROUND OF THE INVENTION

1. Field of the Invention

The present invention relates to tool boxes, and especially to tool boxes that are attached to a truck bed, e.g., the bed of a pickup truck. The present invention overcomes many difficulties that occur with prior art tool boxes including wind and water tightness at highway speeds, hinge problems, structural and dimensional limitations, etc.

2. Information Disclosure Statement

The following patents relate to tool boxes, tool chests and tool storage units:

U.S. Pat. No. 4,084,865 describes a utility container comprising a container body, a plurality of drawers, a plurality of drawer guide inserts and a slide cover, the slide cover being substantially biplanar to enclose the front and top of the container body, one edge of the cover being wrapped around the rear panel of the container body and the other edge being wrapped around the bottom of the container body to limit displacement of the cover relative to the container to a lateral sliding displacement, and the plurality of drawers and drawer guide inserts being easily removed and rearranged or replaced with a recording tape cassette or cartridge storage insert. Two or more such containers may be stacked on one anther by way of a slot and raised rear wall member. In addition, the drawers may be individually removed and temporarily stacked in the top of the container rear wall for improved access to contents. The cover may be locked.

U.S. Pat. No. 4,303,158 describes a tool box for small hand tools and associated items, which opens up from the front as well as the top and which is provided with supporting elements for holding certain tools contained therein in an upright position. The tool box includes a bottom wall, a back wall, a pair of opposed side walls, a top cover which is hingedly connected at its back edge to the back wall and which is provided with a built-in storage compartment and a front cover which is hindgedly connected at its bottom edge to a front plate and which includes a strip magnet on its inside surface on which can be mounted metal tools. A shelf having a plurality of holes into which can be inserted tools and suspended therein in an upright position is mounted inside the tool box near the top and a removable tray having adjustable compartments is seated on a shelf inside the tool box near the bottom. A pull-out drawer having adjustable compartments is located underneath the tray. The tool box lends itself to an orderly arrangement of the tools and items being stored. In addition when the covers are opened, all of the tools suspended on the shelf near the top and mounted on the strip magnet are clearly visible and easily accessible.

U.S. Pat. No. 4,691,470 describes a tackle box that has superposed interlinked trays which are stacked inside of the box when it is closed and which are moved into a staggered opened out configuration by cantilever linkages when the box is opened. The trays are made of a clear plastic material capable of transmitting light by edge lighting. The uppermost and lowermost trays have central compartments receiving respective self-contained flashlight-type light fittings each with a light bulb received in a socket formed in the base wall of the respective tray. When activated, the respective light bulbs light the respective trays be edge lighting. The light fittings have plunger-type switches projecting upwardly for actuation by the tackle box lid and the intermediate tray respectfully so that the lighting system is automatically actuated when the box is opened. The switches can be permanently positioned in an off condition for daylight use. The light fittings may be removed for independent use as flashlights.

U.S. Pat. No. 4,770,330 describes a tool box designed to be size adjustable and for disassembly for easy storage and shipment. It has a removable center compartment and a pair of preferably identical end storage compartments adapted for conforming straddle bed fitting in the bed of a pickup. The center section may be used for wide tool boxes, and as well may be removed for narrow bed tool boxes, and as well may be removed for storage. Thus, significant advantages of the three-piece straddle bed tool box are achieved.

U.S. Pat. No. 5,439,108 describes a tool box having a plurality of trays stackable therein providing a snug fit for each of the trays located therein so as to prevent any lateral movement of the trays as the tool box is moved. Further, a topmost tray is engaged the lid of the tool box when the lid is closed, thereby preventing any vertical movement of the trays as the tool box is moved. In this manner, the contents of each compartment of each tray remain in place even if the tool box is dropped as long as the lid does not open. Two latches on the front of the tool box prevent the lid from opening as the tool box is moved about.

U.S. Pat. No. 5,598,961 describes a chest for use in a pickup truck including a chest bottom forming a compartment and having a rim extending around its open upper end. A chest top includes a frame adapted to matingly fit against the rim of the chest bottom and forms at least one frame opening therein. A chest lid is hinged to the chest top and is sized to fit in covering relation over the frame opening. The top frame and the chest bottom are detachably secured together.

U.S. Pat. No. 5,743,584 describes a vehicle-mounted storage unit for use with a vehicle having a rear door, comprising a cabinet having front and back portions, a door in the front portion of the cabinet, a locking device for the door, a mounting device attached to the floor of a vehicle, and mounting means for attaching the cabinet to the mounting device such that the mounting means is located inside the cabinet such that the mounting means may be accessed only if the door is open, wherein the storage unit is located adjacent to a door of the vehicle, and the door in the front portion of the cabinet opens toward the door of the vehicle.

U.S. Pat. No. 5,779,047 describes a steel tool box that is encapsulated in a polyethylene shell comprising a base unit and a two piece drop front lid unit, which when closed and locked provide an air and water tight shell over the steel working area. The inner steel walls holding the drawer sliding and hanging fixtures are molded into the inner plastic walls of the base through a modified rotational molding process. Weight is significantly reduced by eliminating the outside steel walls of conventional steel tool boxes. This is possible through the modified molding process of parts into plastic.

U.S. Pat. No. 5,873,463 describes a tool box in which tools, hardware, parts, and the like stored therein can be displayed, accessed, and retrieved in a quick, convenient, and efficient manner. Tools, hardware, and the like can be displayed and distinguished one from the other, accessed, removed, and stored quickly, and easily. The tool box has mating hinged container portions and mating hinged cover portions that may be pivotally opened for display, access, and retrieval of tools, hardware, and the like stored therein. Display storage cases may be removably and pivotally adjoined one to the other. The tool box is durable, light weight, inexpensive, safe to use, attractive, sturdy, and of simple construction, and may be of metal, such as aluminum or steel, thermoplastics, thermosetting polymers, rubber, or other suitable material or combination thereof.

U.S. Pat. No. 5,882,097 describes a tool box including a bin section for receipt of tools, trays and removable containers or compartments. A hinged lid fits onto the bin portion of the tool box and is designed to retain the various containers and trays in position when closed. The area of the lid is enclosed within the profile of the base of the bin to facilitate sitting and standing thereon and to increase stability of the assembly.

Notwithstanding the prior art, the present invention is neither taught nor rendered obvious thereby.

SUMMARY OF THE INVENTION

The present invention is a tool box for mounting on a truck bed. It includes a base component and a top component. The base component has a bottom, a left side, a right side, and a back, and has an open front and an open top. The base component further includes a first inside pivot assembly area on the left side and a second inside pivot assembly area on the right side. The top component has a top, a back extending downwardly from the top, a front extending downwardly from the top, a left side, and a right side. Each of these sides are connected to the back and the front and extend downwardly from the top. The top component has a first outside pivot assembly area on the left side and a second outside pivot assembly area on the right side. The base component has a predetermined width and the top component has an overall width greater than the predetermined width of the base component so that the top component nests on top of the base component and the left side and right side of the top component are exterior to the left side and the right side of the base component. The top component and the base component have an open position with the top component positioned up relative to the base component, and have a closed position with the top component positioned down relative to the base component. There is also a left pivot assembly and a right pivot assembly. The left pivot assembly is located at the first inside pivot assembly area and at the first outside pivot assembly area. The right pivot assembly is located at the second inside pivot assembly area and at the second outside pivot assembly area. Thus, the top component left side and the base component left side are pivotally connected to one anther, and the top component right side and the base component right side are pivotally connected to one another.

In some embodiments of the present invention tool box, the top component has a predetermined outer perimeter, and has a predetermined size and shape to pivot downwardly and to close onto the base component so as to create a first weather and wind seal at its outer perimeter. Further, and in addition, in some preferred embodiments, the present invention tool box top component sides have inside flanges and the base component sides have outside flanges, so that the inside flanges and the outside flanges correspond and complementarily contact one another when the top component and the base component are closed, so as to create a secondary weather and wind seal. The outside flanges radiate, toward back and around, and toward front and down, from the inside pivot assembly areas. The inside flanges of the top component likewise radiate from the outside pivot areas corresponding to the outside flanges so as to seal with them when the top and bottom components are in the closed position. Thus, when the top component is moved upwardly to open, its back moves down (it is behind the pivot assembly), and, hence, the rear portion of the sealing inside flange of the top component moves downward.

In some embodiments, the tool box left pivot assembly and the right pivot assembly are each separate shafts with attachment means, i.e., shafts with heads and with pins or caps passing through two orifices. In other embodiments, the left pivot assembly and the right pivot assembly are each separate bolts with attachments means, such as nuts, lock bolts, with or without washers, etc.

In other preferred embodiments, the left side and the right side of the base member each have a tapered front edge that taper inwardly with increasing height from its bottom. Further, in many preferred embodiments, the left side and the right side of the top component are generally inverted "L" shaped. Also, the back of the top component is short to permit clearance on opening, and, for example, is less than 20% in height of a predetermined height of the back of the base component.

In some embodiments, the base component includes a front lip at its bottom for nesting with the front of the top component. Also, in some embodiments of the present invention, a locking mechanism is included. In other words, there may be a latch, and the latch may include or not include a lock. Some preferred embodiments include a latch assembly having two interlocking elements, one being located on the top component, and the other being complementarily located on the base component. In preferred embodiments, a male element that moves into a female element to lock may be a slider bar, a tongue, a hook, or any other known latching mechanism. It may also include a key or combination pad or other lock mechanism.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Existing tool boxes that are used for traveling workmen, craftsmen, carpenters, plumbers, etc. that are mounted on motor vehicles have a number of drawbacks. These include leakage during heavy rain or even light rain under traveling conditions; height and width entry reduction caused by structural framing; limited top entry access; doors dropping downward while driving that cause loss of tools/equipment; and, sprung hinges or twisted hinges with door alignment problems. All of these difficulties are overcome by the present invention tool box.

The present invention tool boxes eliminate hinges, eliminate dropdown doors, provide greater open area top entry, offer superior weather proofing capabilities and decrease welding and other fabrication requirements. In some preferred embodiments the present invention tool boxes provide dual sealing while eliminating the need for gaskets.

Figure 1:
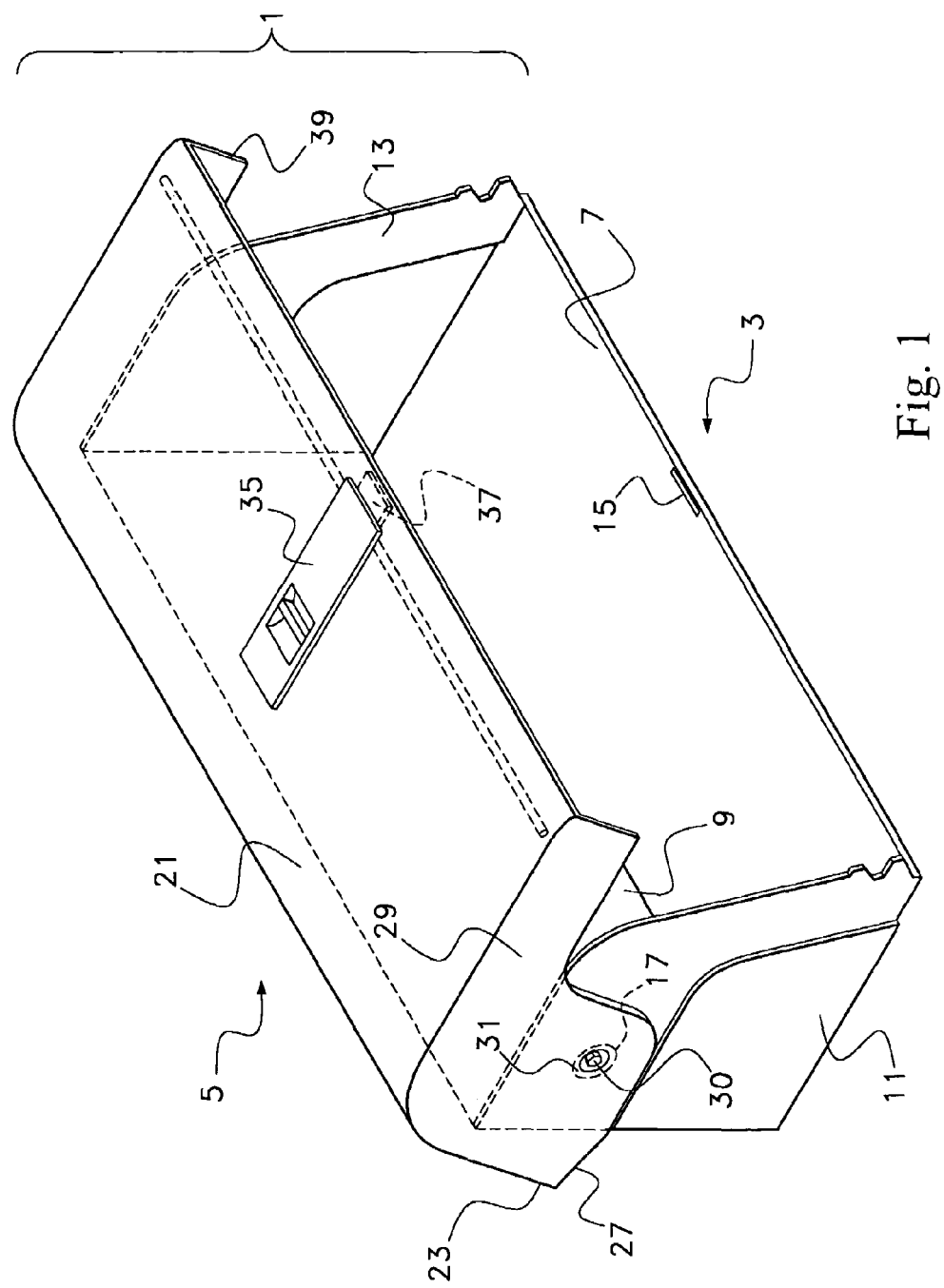
FIG. 1 shows a perspective side view of one embodiment of a present invention tool box in its open position.
Figure 2:
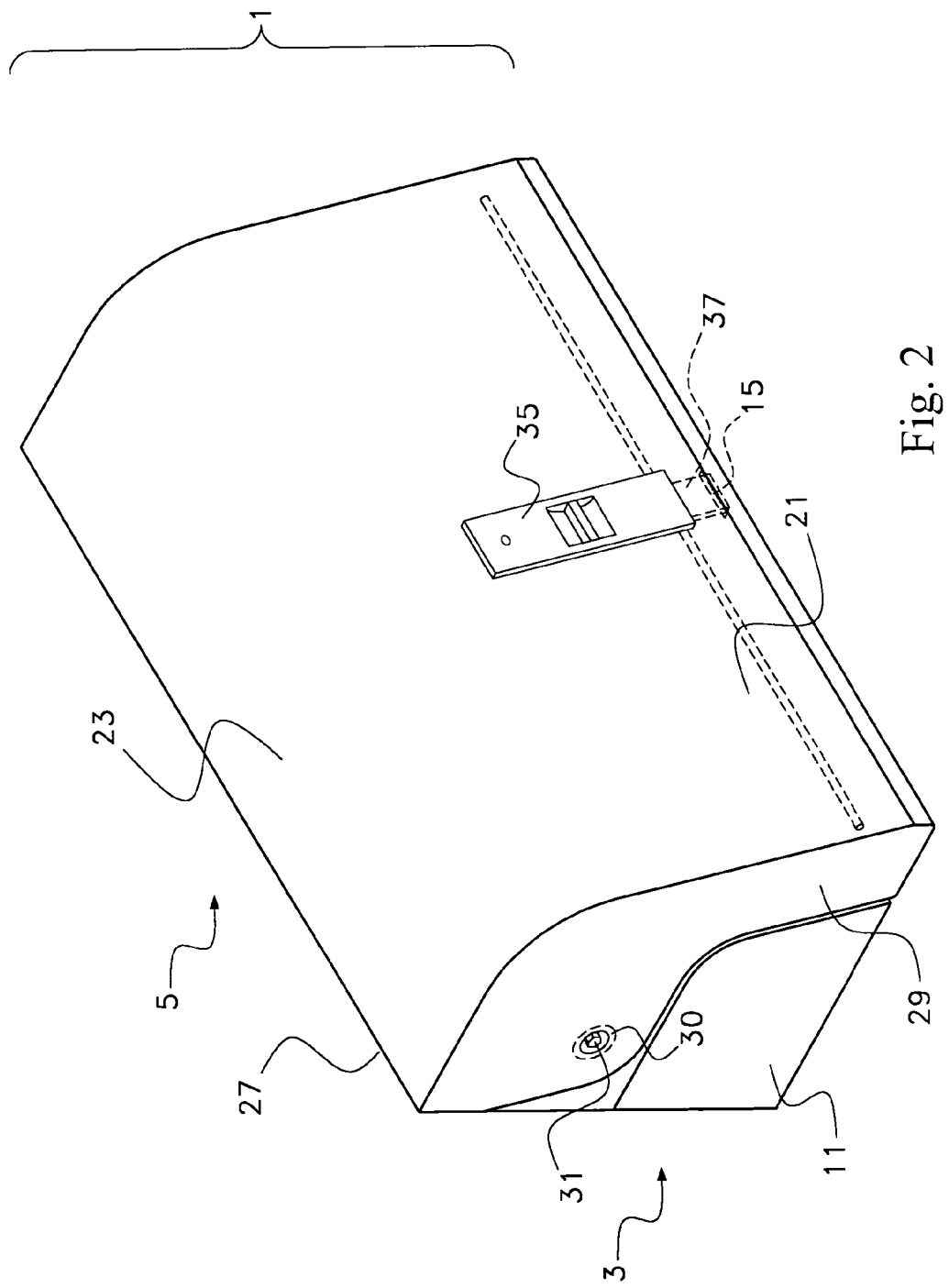
FIG. 2 shows a perspective side view of the present invention device shown in FIG. 1 above, but in a closed locked position.

FIG. 1 and FIG. 2 show side prospective views of a present invention tool box 1. It includes a base component 3 and a top component 5 that are pivotally connected to one another as shown, and as more fully described below. Base component 3 includes a solid bottom 7, a back 9, a left side 11, and a right side 13. In this embodiment, all of these sections of base component 3 are flat, but curvilinear, bulbous or other shapes could be included without exceeding the scope of the present invention. Bottom 7 includes an optional receiver slot 15. Base component 3 includes an open front and an open top.

Top component 5 of tool box 1 shown in FIGS. 1 and 2 include a top 23, front 21, a back 27, a left side 29, and a right side 39. Top component 5 is slightly wider then base component 3 so that left side 29 and right side 39 of top component 5 nest outside of left side 11 and right side 13 of base component 3. Both sets of sides are pivotally connected to each other. This is illustrated with respect to left side 29 and left side 11, left side 11 has an outside pivot attachment area 17 and left side 29 has an inside pivot attachment area and includes an orifice through which attachment rivet 31 is rotatably attached. Thus, a user may lift top component 5 upwardly to completely expose the entire front area and an above it for top entry. This enables a user to remove a tool from a tray or to open a smaller tool box inside without removal of that tray or box inside. Handle and latch 35 is included in top component front 21 with locking side bars and male tongue latch 37 for locking insertion into receiver slot 15. FIG. 1 shows present invention tool box 1 in its open position and FIG. 2 shows it closed and locked. Identical parts are identically numbered in FIGS. 1 and 2.

Figure 3:
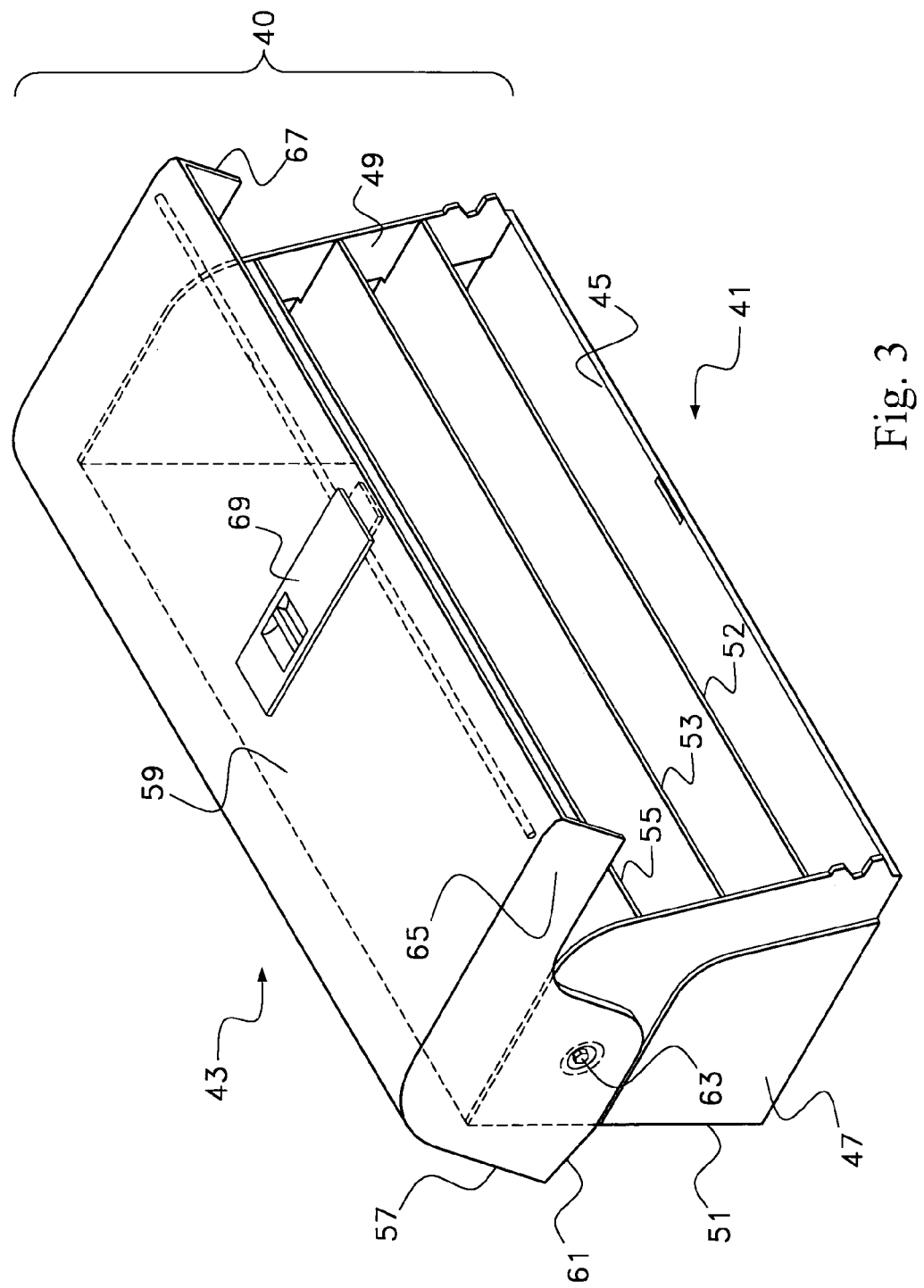
FIGS. 3, 4, and 5 all show other perspective views of alternative embodiment present invention tool boxes; and, FIG. 6 shows a left outside side view of another present invention in its open position.

Referring to FIG. 3, there is shown an alternative preferred embodiment present invention tool box 40. Base component 41 has a bottom 45, a left side 47, a right side 49 and a back 51. It has an open top and an open front. Top component 43 includes a top 57, a back 61, a front 59, left side 65, a right side 67 and a latch mechanism 69. Top component 43 and base component 41 are pivotally connected to one another separately at their left sides and right sides in pivot assembly areas with pins such as pin 63. Bottom component 41 includes horizontal shells 52, 53, and 55.

Figure 4:
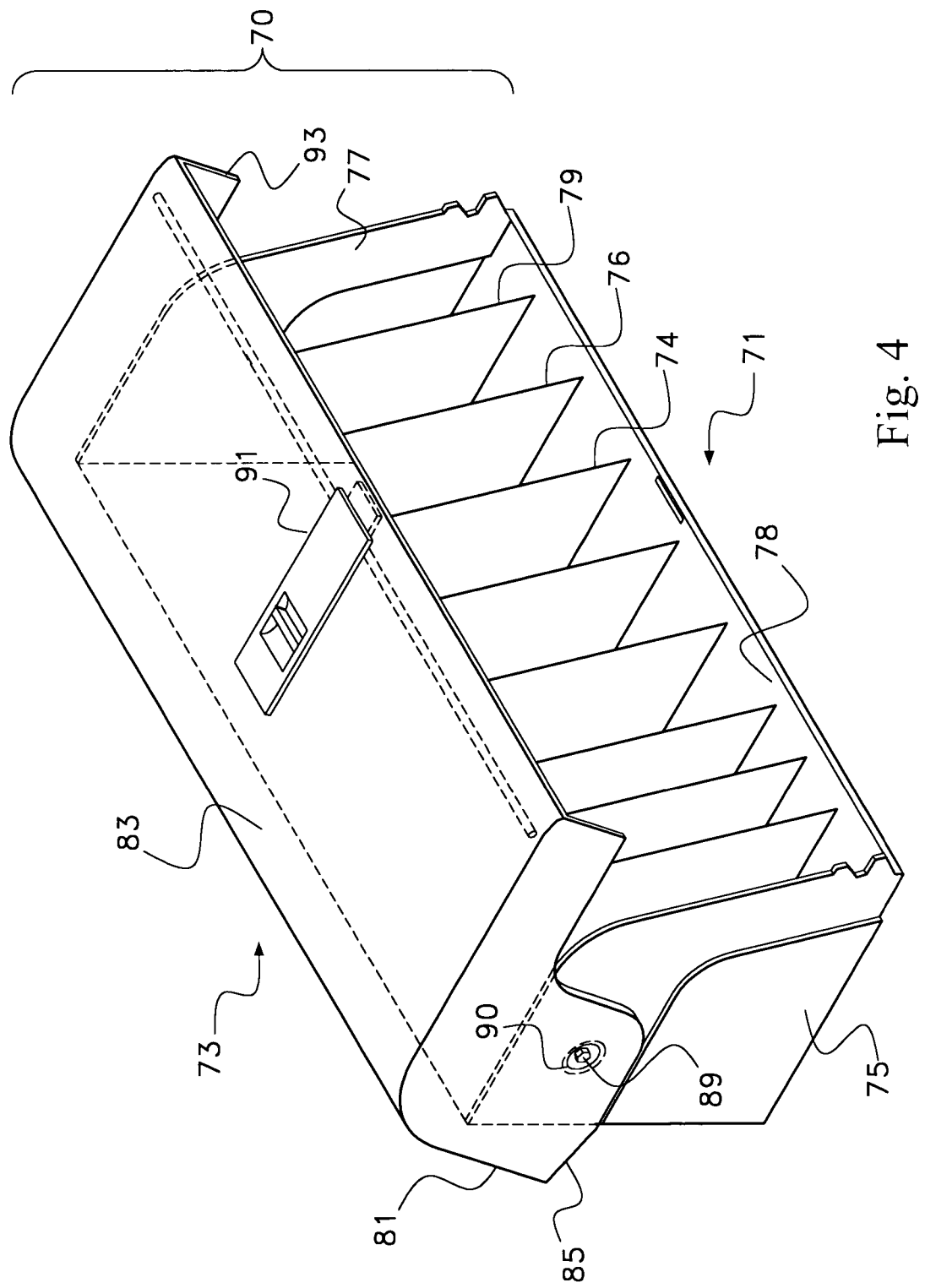

FIG. 4 shows a similar present invention preferred embodiment tool box 70, with base component 71 and top component 73. Bottom 78 is connected to side walls 75 and 77 and includes a plurality of vertical dividers such as dividers 74, 76 and 79. Top component 73 includes a top 81 and a front 83 with left and right sides 85 and 93, as well as latch 91. Top component 73 is connected at assembly area 90 to base component side wall 75 via pin 89, and is similarly connected at its opposite side.

Figure 5:
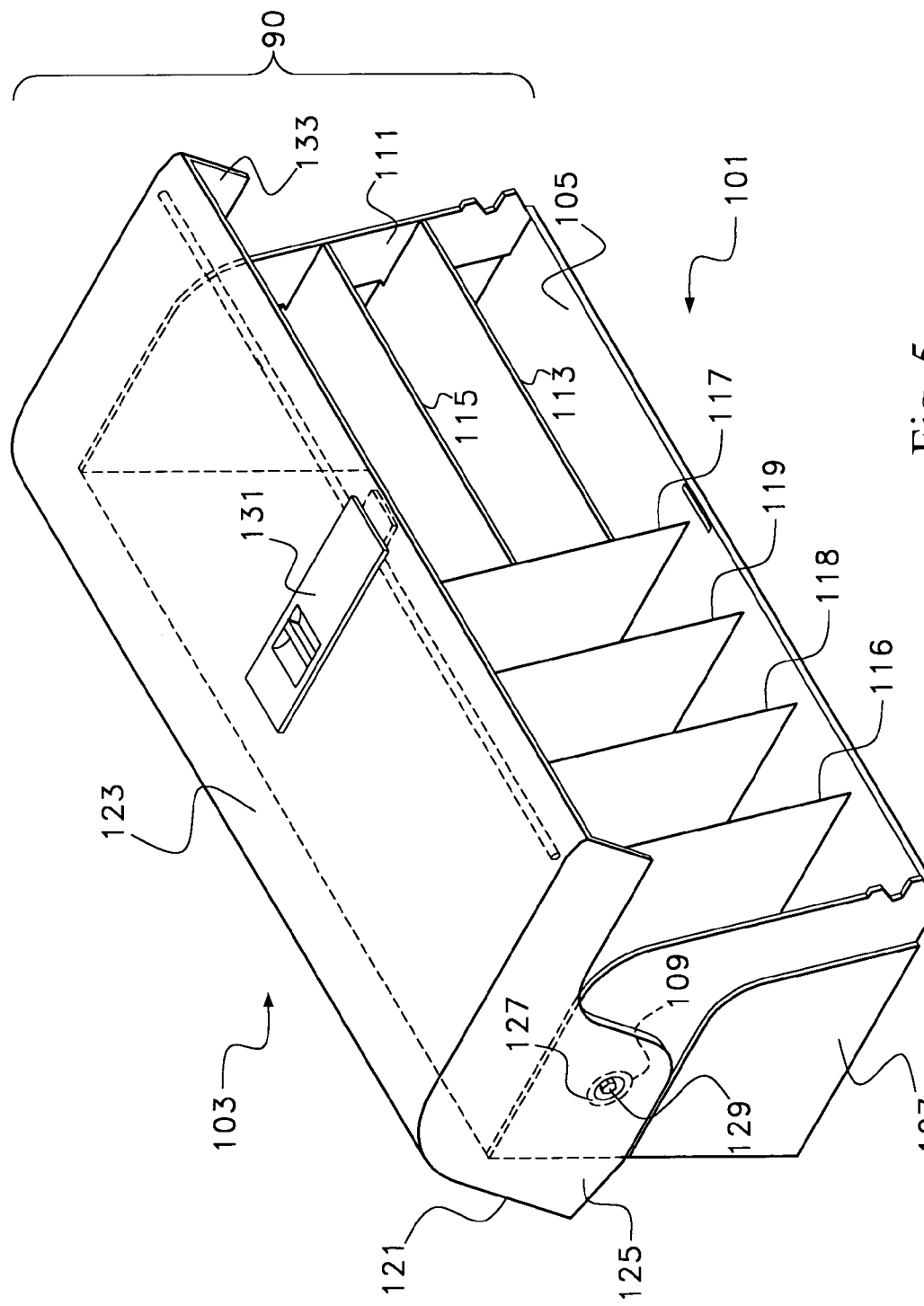

FIG. 5 shows tool box 90 with basic component 101 and top component 103. Base component 101 has a bottom 105, a left wall 107, and right wall 111 and an open top and open front. Top component 103 has a top 121, a front 123, a small back (not shown), left side 125, right side 133 and locking latch 131. Base component 101 contains vertical dividers 116, 118, and 119, and horizontal shelves 113 and 115. Top component 103 is connected to base component 101 at base component assembly area 109 and top component assembly area 127 by a bolt 129.

Figure 6:
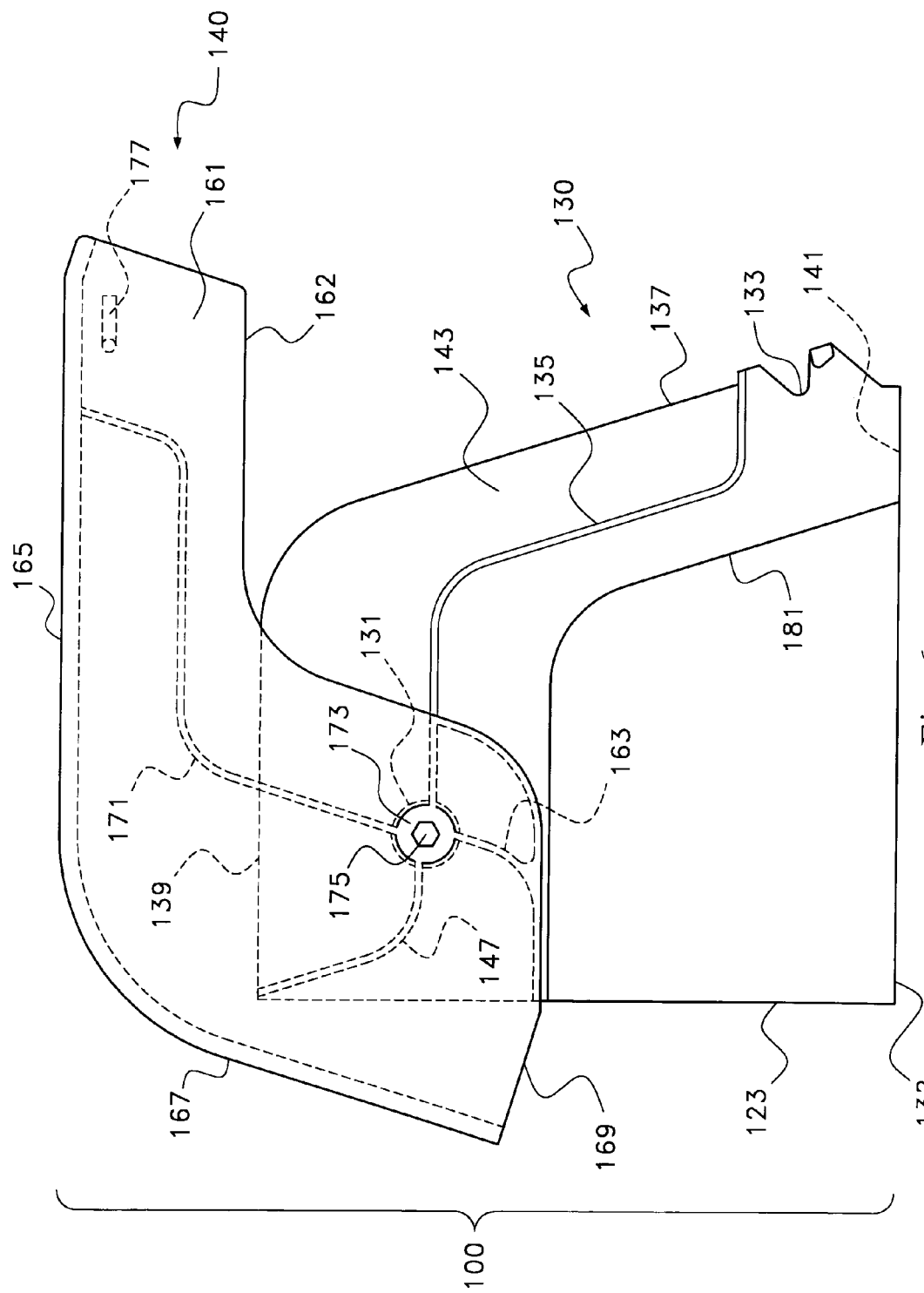
Figure 7:
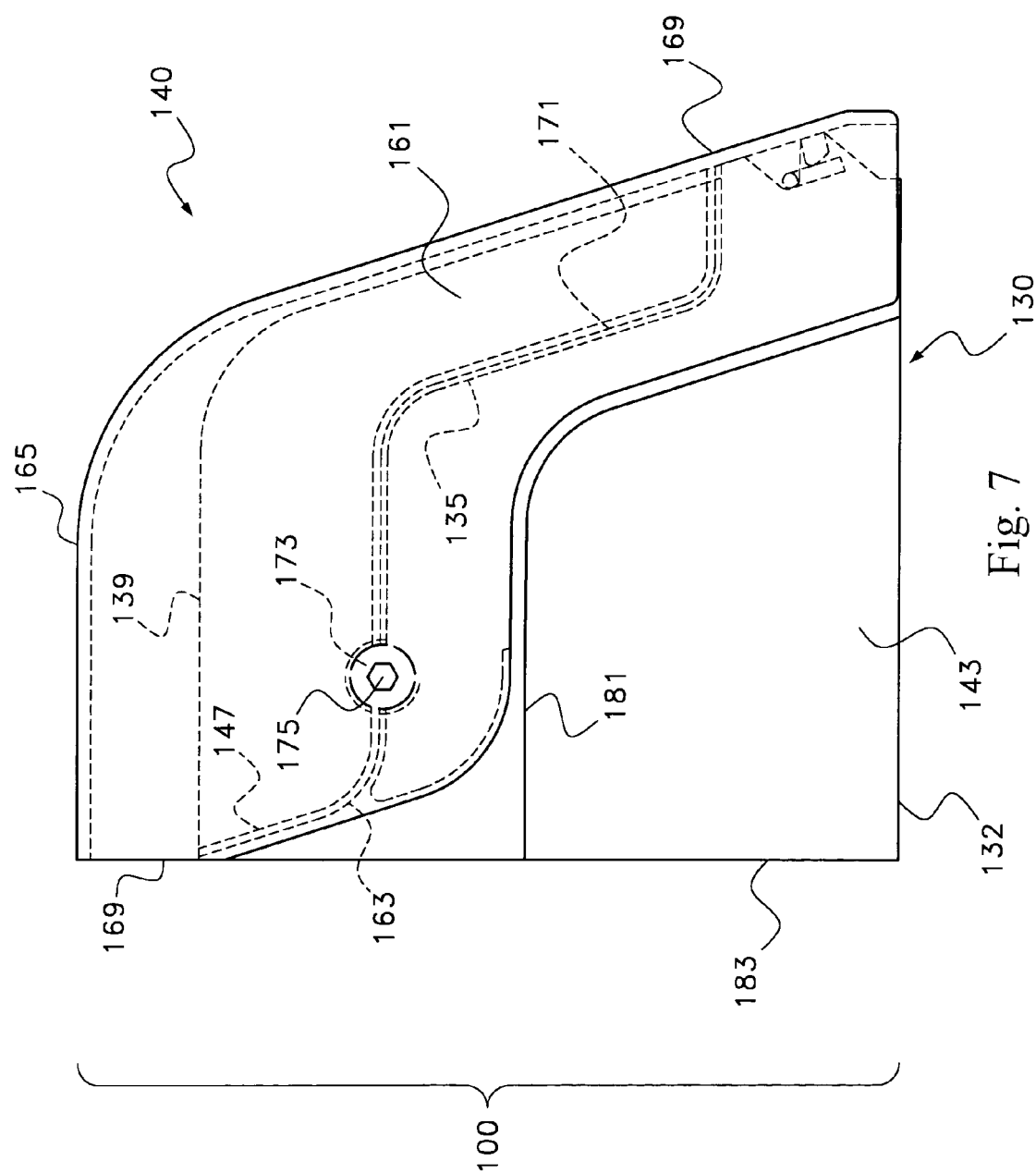
FIG. 7 shows a left outside side view of the same.

FIGS. 6 and 7 show left side opened and closed views of a preferred embodiment present invention tool box 100. Identical parts are identically numbered in both figures, and these two figures are discussed together. Present invention tool box 100 has a base component 130 and a top component 140. Base component 130 includes a bottom 132, a left side 143, a right side (not shown but symmetrical to and opposing left side 143), and a back 183. It is recessed at line 181, the portion of left side 143 below line 181 being closer to the viewer than the portion of left side 143 above line 181. This recess line 181 nests with the bottom edge 162 of the top component left side 161 when closed. In addition, there is a secondary sealing rib 135 on the outside of left side 143 of base component 130.

Top component 140 has a top 167, a back 169, a front 165, and a left side 161. Left side 161 has inside secondary sealing ribs 163 and 171. As top component 141 is closed, rib 171 nests upon rib 135 and rib 163 nests under rib 147. This creates a strong secondary seal to prevent wind and rain from entering tool box 100 under windy rainy conditions or other wet conditions at highway speeds.

Base component left side 143 has a pivot assembly area 131 that may be an orifice, a recess, a protrusion, or combination of these adapted to align, and in some cases nest, with the corresponding pivot assembly area 173 of top component left side 161. In this case, these areas are orificed and they are pivotally connected via bolt 175 (with washers and bolt fastener, not shown). When top component 140 is closed, the insides of top component back 169, top component top 167 and top component front 165 all contact edges 137 or 183 to create a primary closing seal. Additionally, side latch 177, when locked, will catch boss 133 to prevent opening.

Obviously, numerous modifications and variations of the present invention are possible in light of the above teachings. It is therefore understood that within the scope of the appended claims, the invention may be practiced otherwise than as specifically described herein.

What is claimed is:

1. A tool box for mounting on a truck bed, which comprises:
   (a) a base component, said base component having a bottom, a left side, a right side, and a back, and having an open front and an open top, said base component further including a first inside pivot assembly area on said left side and a second inside pivot assembly area on said right side;
   (b) a top component, said top component having a top, a back extending downwardly from said top, a front extending downwardly from said top, a left side and a right side, each being connected to said back and said front and extending downwardly from said top, said top component having a first outside pivot assembly area on said left side and a second outside pivot assembly area on said right side, said base component having a predetermined width and said top component having an overall width greater than said predetermined width of said base component wherein said top component nests on top of said base component and said left side and right side of said top component are exterior to said left side and said right side of said base component, said top component and said base component having an open position with said top component positioned up relative to said base component, and having a closed position with said top component positioned down relative to said base component; and,
   (c) a left pivot assembly and a right pivot assembly, said left pivot assembly being located at said first inside pivot assembly area and at said first outside pivot assembly area, and said right pivot assembly being located at said second inside pivot assembly area and at said second outside pivot assembly area, such that said top component left side and said base component left side are pivotally connected to one another, and said top component right side and said base component right side are pivotally connected to one another, wherein said top component has a predetermined outer perimeter, and has a predetermined size and shape to pivot downwardly and to close onto said base component so as to create a first weather and wind seal at its perimeter and wherein said top component sides have weather-sealing inside flanges and said base component sides have weather-sealing outside flanges, said weather-sealing inside flanges and said weather-sealing outside flanges being corresponding and complementary so as to contact one another when said top component and said base component are closed, so as to create a secondary weather and wind seal.

2. The tool box of claim 1 wherein said left pivot assembly and said right pivot assembly are each separate pins with attachment means.

3. The tool box of claim 1 wherein said left pivot assembly and said right pivot assembly are each separate bolts with attachments means.

4. The tool box of claim 1 wherein said left side and said right side of said base member each have a tapered front edge that taper inwardly with increasing height from its bottom.

5. The tool box of claim 1 wherein said left side and said right side of said top components are generally inverted "L" shaped.

6. The tool box of claim 1 wherein said base component includes a front lip at its bottom for nesting with said front of said top component.

7. The tool box of claim 1 wherein said back of said top component is less than 20% in height of a predetermined height of said back of said component.

8. A tool box for a mounting on a truck bed, which comprises:

(a) a base component, said base component having a bottom, a left side, a right side, and a back, and having an open front and an open top, said base component further including a first inside pivot assembly area on said left side and a second inside pivot assembly area on said right side;

(b) a top component, said top component having a top, a back extending downwardly from said top, a front extending downwardly from said top, a left side, and a right side, each being connected to said back and said front and extending downwardly from said top, said top component having a first outside pivot assembly area on said left side and a second outside pivot assembly area on said right side, said base component having a predetermined width and said top component having an overall width greater than said predetermined width of said base component wherein said top component nests on top of said base component and said left side and said right side of said top component are exterior to said left side and said right side of said base component, said top component and said base component having an open position with said top component positioned up relative to said base component, and having a closed position with said top component position down relative to said base component;

(c) a left pivot assembly and a right pivot assembly, said left pivot assembly being located at said first inside pivot assembly area and at said first outside pivot assembly area, and said right pivot assembly being located at said second inside pivot assembly area and at said second outside pivot assembly area, such that said top component left side and said base component left side are pivotally connected to one another, and said top component right side and said base component right side are pivotally connected to one another; and, (d) a latch assembly having two interlocking elements, one being located on said top component, and the other being complementarily located on said base component;

wherein said top component has a predetermined outer perimeter, and has a predetermined size and shape to pivot downwardly and to close onto said base component so as to create a first weather and wind seal at its outer perimeter and wherein said top component sides have weather-sealing inside flanges and said base component sides have weather-sealing outside flanges, said weather-sealing inside flanges and said weather-sealing outside flanges being corresponding and complementary so as to contact one another when said top component and said base component are closed, so as to create a secondary weather and wind seal.

9. The tool box of claim 8 wherein said left pivot assembly and said right pivot assembly are each separate shafts with attachment means.

10. The tool box of claim 8 wherein said left pivot assembly and said right pivot assembly are each separate bolts with attachments means.

11. The tool box of claim 8 wherein said left said and said right side of said base member each have a tapered front edge that taper inwardly with increasing height from its bottom.

12. The tool box of claim 8 wherein said left side and said right side of said top component are generally inverted "L" shaped.

13. The tool box of claim 8 wherein said base components includes a front lip as its bottom for nesting with said front and said top component.

14. The tool box of claim 8 wherein said back of said top component is less than 20% in height of a predetermined height of said back of said base component.

* * * * *